United States Patent [19]
Hull et al.

[11] Patent Number: 5,516,426
[45] Date of Patent: May 14, 1996

[54] SELF-CLEANING FILTER SYSTEM

[76] Inventors: Harold L. Hull, 401 Canyon Way #43; Cathy D. Santa Cruz, 451 Canyon Way #72, both of Sparks, Nev. 89434

[21] Appl. No.: 391,923

[22] Filed: Feb. 21, 1995

[51] Int. Cl.$^6$ .......................... B01D 29/54; B01D 33/39; B01D 35/12
[52] U.S. Cl. ...................... 210/256; 210/330; 210/333.1; 210/354; 210/359; 55/285; 55/484
[58] Field of Search .................................. 210/330, 398, 210/359, 256, 354, 333.1; 55/350.1, 484, 242, 302, 284, 285, 286

[56] References Cited

U.S. PATENT DOCUMENTS

| | | |
|---|---|---|
| 943,908 | 12/1909 | Bailey . |
| 1,826,361 | 10/1931 | McNeal . |
| 2,057,497 | 10/1936 | McNeal . |
| 2,069,963 | 2/1937 | McNeal . |
| 2,103,483 | 12/1937 | McNeal . |
| 2,183,578 | 12/1939 | McNeal . |
| 2,184,177 | 12/1939 | Burrell . |
| 2,246,877 | 6/1941 | Cunningham . |
| 2,310,587 | 2/1943 | MacNeill . |
| 2,382,656 | 8/1945 | Obenshain . |
| 3,228,528 | 1/1966 | Mummert et al. . |
| 3,625,361 | 12/1971 | Frazier . |
| 3,703,465 | 11/1972 | Reece et al. . |
| 4,224,958 | 9/1980 | Kaplan . |
| 4,271,018 | 6/1981 | Driori . |
| 4,415,448 | 11/1983 | Lennartz et al. ...................... 210/333.1 |
| 4,481,111 | 11/1984 | Christophe et al. ................ 210/333.01 |
| 4,514,193 | 4/1985 | Booth . |
| 4,588,502 | 5/1986 | Zibell . |
| 4,619,600 | 10/1986 | Gneuss . |
| 4,666,592 | 5/1987 | Bea ......................................... 210/107 |
| 4,710,288 | 12/1987 | Patrovsky . |
| 4,781,825 | 11/1988 | Grimes et al. ........................... 210/107 |
| 4,814,076 | 3/1989 | Jackson . |
| 4,844,789 | 7/1989 | Lundqvist . |
| 4,850,840 | 7/1989 | Gneuss . |
| 4,906,373 | 3/1990 | Drori . |
| 4,923,601 | 5/1990 | Drori . |
| 5,090,887 | 2/1992 | Gneuss . |
| 5,108,592 | 4/1992 | Wilkins et al. ........................... 210/107 |
| 5,141,631 | 8/1992 | Whitman . |
| 5,200,077 | 4/1993 | McNeice . |
| 5,227,048 | 7/1993 | Seibel . |
| 5,362,223 | 11/1994 | Gneuss . |
| 5,407,586 | 4/1995 | Gneuss . |

FOREIGN PATENT DOCUMENTS

| | | |
|---|---|---|
| 114651 | 8/1984 | European Pat. Off. . |
| 4040024 | 6/1992 | Germany . |

Primary Examiner—Thomas M. Lithgow

[57] ABSTRACT

A continuous, self-cleaning rotary filtering system is herein provided which includes a plurality of filtering elements within a rotatable filter housing adapted for rotation between an inlet plate having single or multiple inlet ports and an outlet plate having single or multiple outlet ports so that a substance to be filtered is passed from the inlet ports through at least one incomplete toroidal cavity within the inlet and outlet plates, through the filter elements and into the outlet ports. The apparatus is further provided with single or multiple backflushing capabilities, whereby, when the filter housing is rotated passed a single or multiple backflush port, a cleaning agent will be caused to flow backward through at least one of the filter elements and backflush ports to purge contaminants from the system via the backflush port or ports without interrupting the stream flow or pressure of the substance to be filtered. Also, several different substances may be used at the same time through multiple backflush ports, such as the filtered substance itself, solvents, air, steam, oil, etc. and the output of one of the output ports may be fed back into the input of a second input port for additional cleaning through a series of different filters which may have different characteristics.

5 Claims, 6 Drawing Sheets

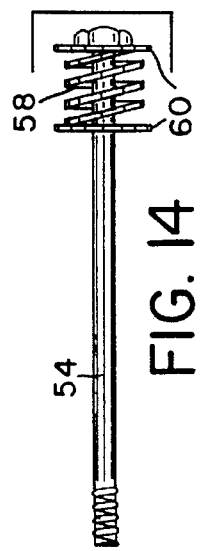
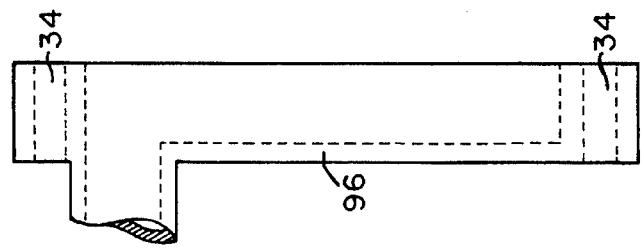
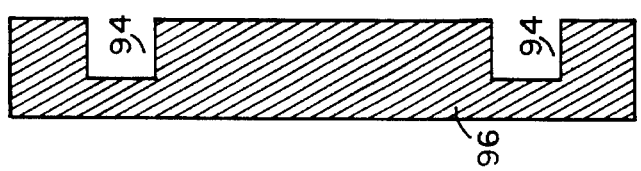
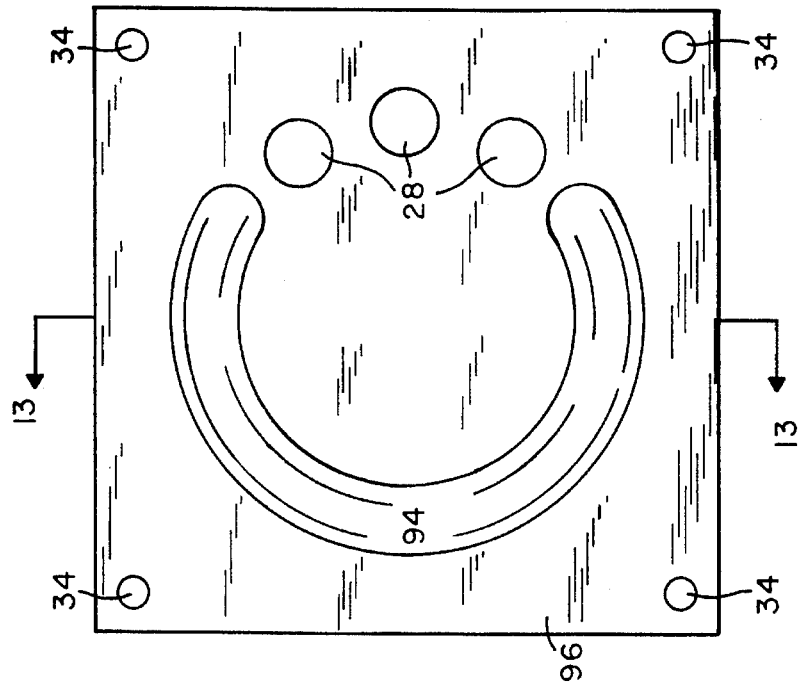

SELF-CLEANING FILTER SYSTEM

FILED OF THE INVENTION

This invention relates to filters but more particularly relates to a filter which cleans itself each revolution.

BACKGROUND OF THE INVENTION

The problems connected with filtering unwanted particles or substances from a liquid, gaseous or particulate substance has been addressed by many individuals, Companies, etc., which has resulted in a variety of filtering means using various apparatuses and filtering media which has resulted in general in expensive equipment involving replaceable filters, back flushing valves and apparatus, etc.

U.S. Pat. No. 5,200,077 issued Apr. 6, 1993 teaches a "BACKFLUSHABLE ROTARY MELT POLYMER FILTER APPARATUS" which is designed to be used with a hot melt injection mold with no provision for backflushing with any other substance other than the hot melt itself. It teaches an interior port which has no means of control for volume or pressure and only allows a partial flow of the hot melt to directly flow from the exhaust manifold to a backflush port and all the contaminants are normally returned to the incoming stock for recycling, also, the device teaches that it is to be used for a liquid only and no provision is taught for multiple cleaning ports to backflush the filter with several different medias, such as petroleum products, steam, water, air, etc. Also, a racheting system is taught to intermittently rotate the filter elements and the apparatus requires special filter sleeves to recess and seal the filters into recesses, requiring additional machining and separate biasing means in the form of bolts with the bolts acting as part of the racheting means unlike the present invention which uses an off the shelf gear and worm drive for continuous rotation. Many parts and elements are eliminated by the present invention over this prior art. U.S. Pat. No. 5,108,592 issued Apr. 8, 1992 teaches a "ROTARY SELF-CLEANING STRAINER" which is simultaneously cleaned and rotated by a nozzle structure and pertains to a strainer being placed into a body of water with its discharge connected to a pump.

U.S. Pat. No. 4,923,601 issued May 8, 1990, U.S. Pat. No. 4,906,373 issued Mar. 6, 1990, U.S. Pat. No. 4,666,592 issued May 19, 1987 and U.S. Pat. No. 3,703,465 issued Dec. 14, 1970 each teach a filter system with backflushing capabilities and multiple filter elements, however, each of these require a filter housing in the form of a tank-like structure with the backflushing assembly being moved to each filter by some external mechanical connection, such as an arm and each require a different axiom than the present invention.

One of the major problems which must be addressed is the reduction of volume or pressure of the filtered stream whenever a filter becomes clogged or nearly clogged and in most cases results in re-routing the stream through secondary filters while the primary filters are being replaced or back flushed which in many cases is costly and time consuming. Also, a drop in pressure or volume from a constant volume or pressure can be costly and result in other problems.

It is therefore desirable and a need exists to provide a filter system and/or apparatus which is "self-cleaning" and which will provide a constant volume and/or pressure under work conditions to provide a consistent flow of material at all times without "down" time of changing filters, back-flushing, re-routing etc., whereby resulting in a cleaner filtered stream of finished material.

It is therefore contended by the applicants that a need exists for a filter which continually removes unwanted contaminants and disposes of them in a manner which does not necessarily use the finished filter stream for backflushing but through a separate cavity (which acts as a manifold) which separates and removes the contaminants which may then be disposed of.

SUMMARY OF THE INVENTION

It is therefore a primary object to provide a filter system which removes undesirable contaminates from the material stream on a continuous basis.

Another important object is to provide a filter system which provides substantially a constant volume and/or pressure to the effluent side of the filter.

Yet another important object is to provide a filter system which can be constructed in a number of embodiments to fulfill the needs of the industry.

A further object is to provide a filter system which has separate paths for the filter stream and the contaminate removal stream.

Still a further object is to provide a filter system which can use another media or material other than the main stream material, such as steam, compressed air, solvents, etc., for the contaminate removal.

Yet another object is to provide a filter system which may in one embodiment be self-propelled, i.e., driven by the material stream.

Another important object is to provide a filter system which can use multiple stations for cleaning or back flushing which can use various cleaning media of engineering choice, such as the cleaned substance itself, solvents, or steam, etc.

Yet another object is to be able to re-filter the first effluent back into a second set of filters to further clean the effluent to an even cleaner state within the same apparatus.

Still another object is to provide a variable speed of the filter system in order to increase the purity and/or volume pressure of the material stream.

A further object is to provide a filter system which does not allow the receiving end of the filter to come in contact with the "cleaned" stream as it becomes important in air filtering systems such as "clean" room for electronic assembly or bacteria free rooms for surgery.

Yet another important object is to provide a filter system which is not limited in size but can be made small enough, for illustration, to be used to remove contaminants from an auto or diesel exhaust or large enough to span a river and filter unwanted debris or chemicals from the flowing river.

Still another important object is to provide a filter system capable of removing oil from water such as happens in an oil spill.

A further object is to provide a filter system which may continually remove smoke from a smoke stack.

Still a further object is to provide a filter system which is portable and which may be battery powered for use by fire fighters or the like.

It will become apparent that this filter system can utilize practically any conventional filter element design including conventional candle type filter elements, i.e. tubular cartridges or other designs, as well as specific and unique filter designs such as annular screen packs or membranes.

"BRIEF DESCRIPTION OF THE DRAWINGS"

FIG. 11, is an end view of a substitute plate of the preferred embodiment of FIG. 1.

FIG. 12, is a side view of FIG. 11 with the manifold cut out as shown in dotted ghost lines.

FIG. 13, is a sectional view taken at 13—13 of FIG. 11.

FIG. 14, is a side view of a fastening and tensioning means consisting of a bolt, nut, spring and washer.

DETAILED DESCRIPTION OF THE DRAWINGS

Figure 1:
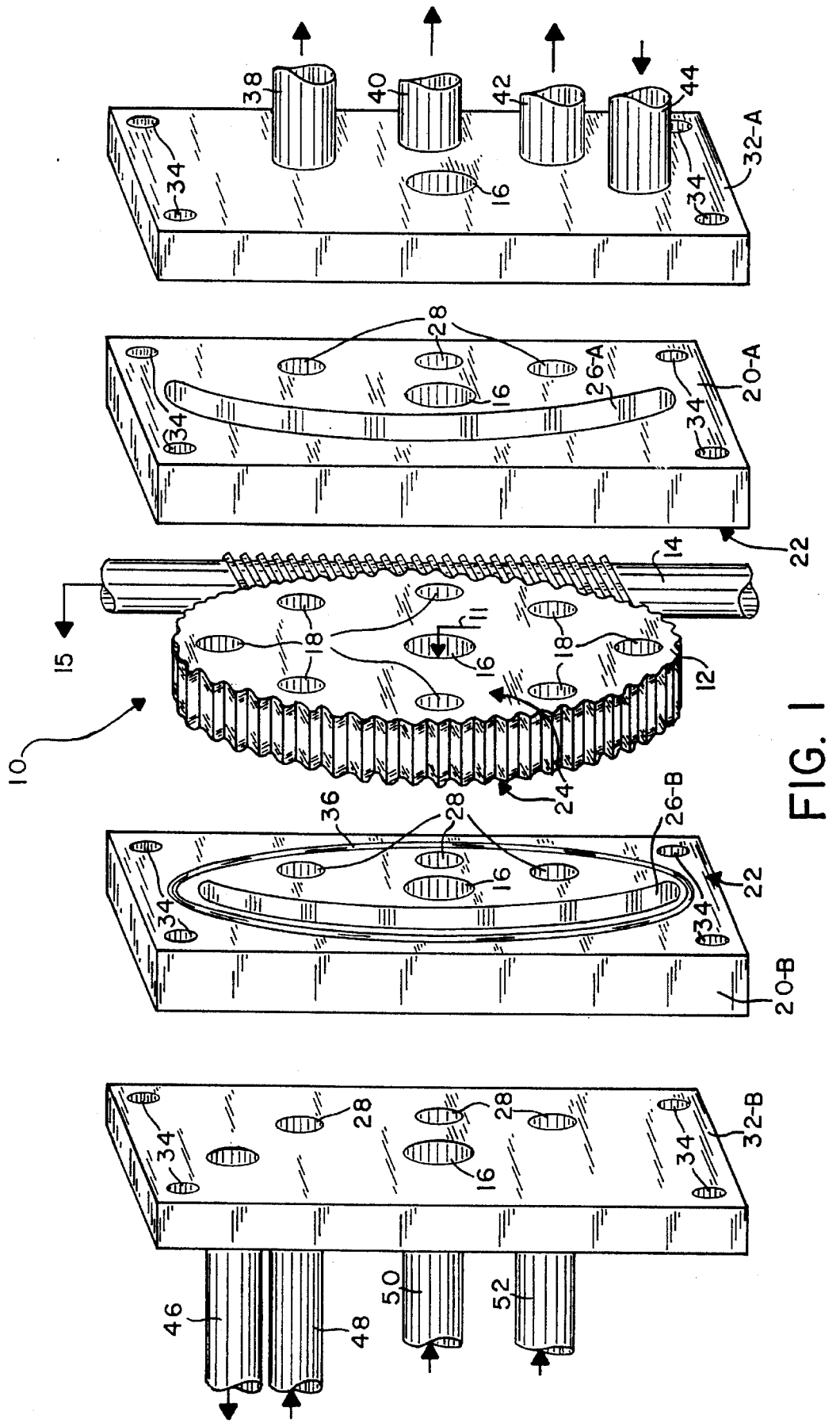
FIG. 1, is an exploded perspective view of the preferred embodiment.
Figure 3:
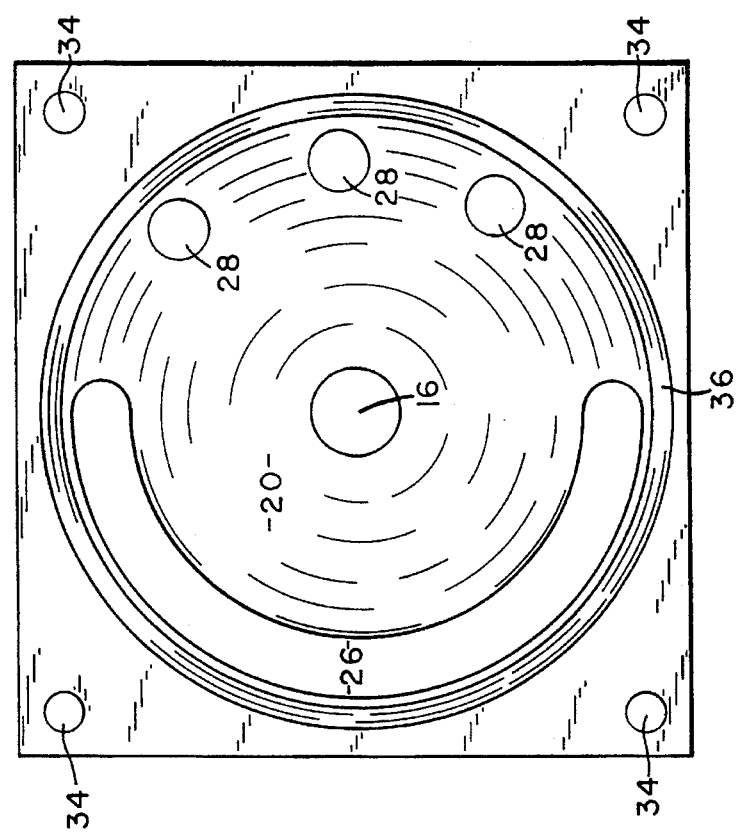
FIG. 3, is a side view of one of plate 20-A of FIG. 1.
Figure 9:
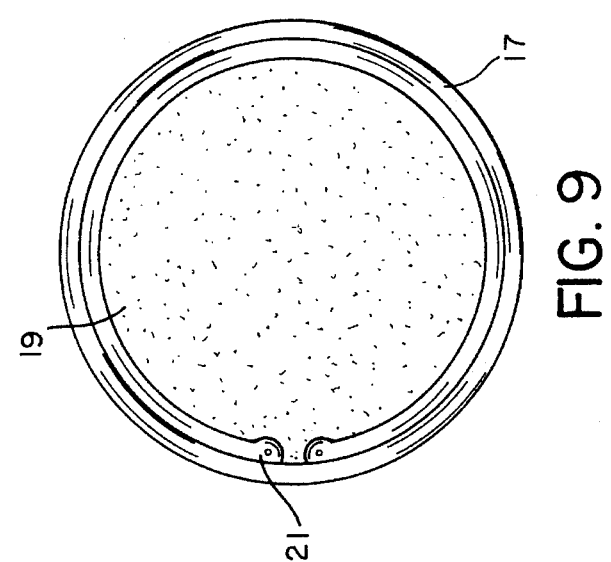
FIG. 9, is an end view of a typical cylinder insert containing a membrane and fastening means.
Figure 10:
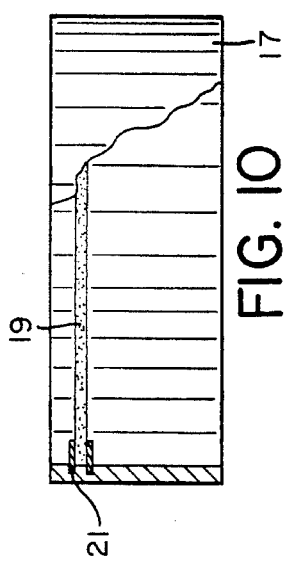
FIG. 10, is a partial cut-a-way view of a typical cylinder insert containing a membrane and fastening means.

Referring to the drawings wherein like characters refer to like elements throughout the various views, shown in FIG. 1, 10 is an over view of a filter housing constructed and arranged for rotational motion about an axis (axis represented by arrow 11) of the housing with the housing having a plurality of holes 18 which are parallel to the axis and disposed in a circular pattern around the axis, such a housing being represented by gear 12 with mating worm gear drive 14, the worm gear drive 14 being driven by a power source typified by arrow 15, such as by a variable speed electric motor (not shown) or by a prior art apparatus driven by the substance being filtered, through suitable drive means (not shown) while 16 is a bore through all of the various elements to accept a shaft (not shown). Shown in FIGS. 9 & 10, respectively, filter means 19 are disposed within holes 18 by a suitable means such as sleeve 17. Sleeve 17 may be a press fit which supports membrane filters 19 by suitable retaining means, such as retaining means 21.

It is to be noted that filters 19 may be substituted by a cannister type filter having a suitable retaining means, (not shown). The filters 19 can be made from many different materials and by engineering choice. A micron size of filtration may be selected to fulfill the requirements of each installation The filters 19 may be selected to filter air, water, sewage, other liquids, etc.

Shown in FIG. 1, 20-A is a first plate having an inlet incomplete toroidal cavity 26-A, a second plate 20-B having an incomplete toroidal cavity 26-B, a third plate 32-A and a fourth plate 32-B. Plates 20 sandwiching the filter housing (gear 12) between them, therefore forming inwardly facing interfacing surfaces 22, to form a seal with the sides 24 of gear 12. Each of plates 20 having at least one backflush port such as 28, which are independent of cavities 26. Ports 38 & 48, 40 & 50 and 42 & 52 are in alignment with each other when assembled and disposed in the path of holes 18 when the filter housing (gear 12) is rotated and means to introduce a flowing backflush substance into the backflush ports 48, 50 & 52, by means such as by pumping, gravity feed, etc.

The third plate 32-A having an inlet port 44 communicating with cavity 26-A of the first plate 20-A and the fourth plate 32-B having an outlet port 46 communicating with the outlet cavity 26-B of the second plate 20-B and each of the plates 32 may include a gasket (not shown). Plates 32 sandwiching the first and second plates 20 and the filter housing (gear 12) together between them. Plates 32, respectively, have at least one backflush port such as 40 & 50 communicating with one of the backflush ports 28 of the first and second plates 20, respectively.

The entire filter system is secured together by suitable means such as bolts 54, nut 56, spring 58 and washers 60 (as shown in FIG. 14) through multiple bolt holes 34. If a better seal is required (by engineering choice) between gear surfaces 24 and plate surfaces 22, a groove 36 may be cut into the plates 20 to hold a suitable sealing means, such as pump packing (not shown).

Figure 2:
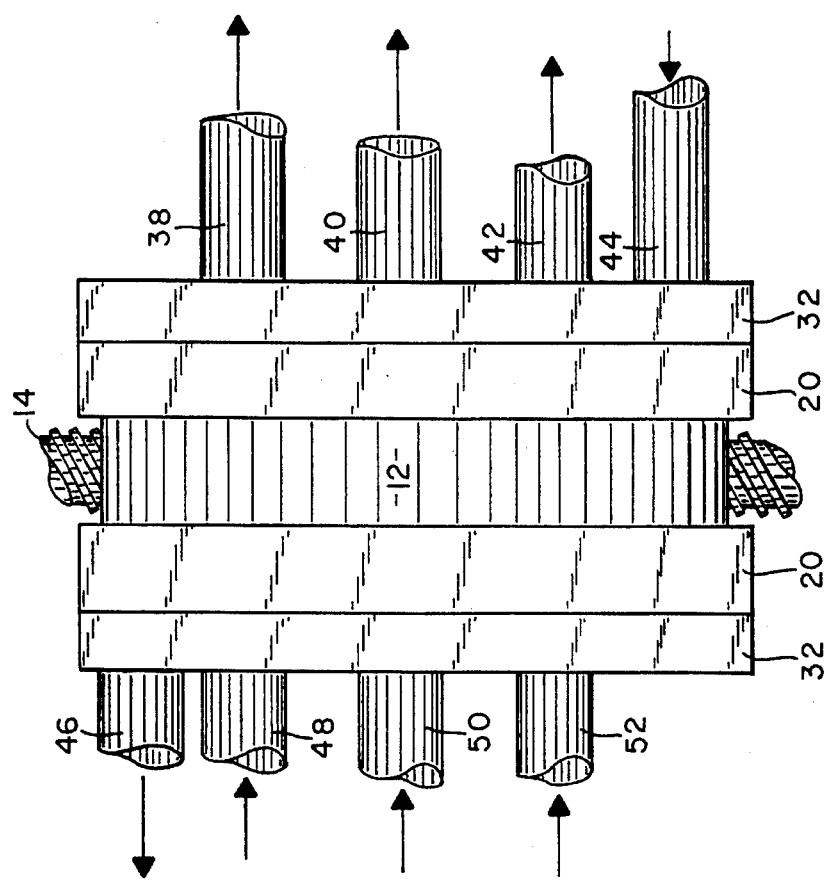
FIG. 2, is a side view of the assembled system of FIG. 1.

It will now be seen that when the filter system is assembled as depicted in FIG. 2 and a shaft (not shown) is inserted through multiple bores 16 that as gear 12 is slowly rotated by worm drive 14, the various filters 19 register with the incomplete toroidal cavities 26 (which act as a manifold) and allow the stream path to enter through port 44 of plate 32-A, through the filters 19 that are registered with the incomplete toroidal cavities 26 of plates 20, and exit through port 46 of plate 32-B. Now as the various individual filters 19 register with backflush ports 28, respectively, the filters may be cleaned by back flushing and may be cleaned in multiple stages (3 are shown) by various cleaning media, such as the cleaned affluent, air, steam or other suitable liquids, such as solvents, etc.

Figure 5:
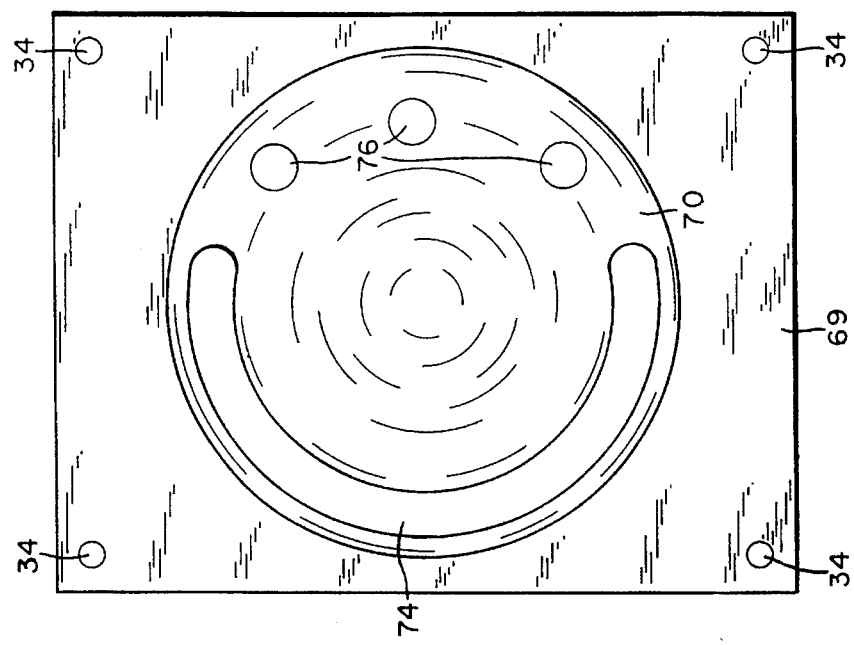
FIG. 5, is an end view of the interior sides of plates 69-A & 69-B of FIG. 4.

In a second embodiment (shown in FIGS. 4 & 5) 62 is a different type of gear which also may be driven by a worm drive or other spur gear (not shown) which has a thinner center core 64 with multiple bores 18 there through, while bores 18 mate with cavities 74 and bores 76 in plates 69. Bores 18 accept a shorter version of cylinder 17 which is drawn to a different scale, shown in FIG. 10. A pair of inner surfaces 68 (shown in FIG. 4) accept the circular bosses 70 of plates 69 which allow the surface of the center core 64 to mate with the surface of the bosses 70 to form a working seal, 72 being a sealing ring supported by a groove in the bosses 70 and may be made of any suitable material such as steel, pump-packing, etc. It will also be noted that the assembly depicted in FIG. 4 may be substituted for the gear and first pair of side plates 20 in FIG. 1. 34 are again multiple bolt holes to accept assembly bolts 54.

Figure 7:
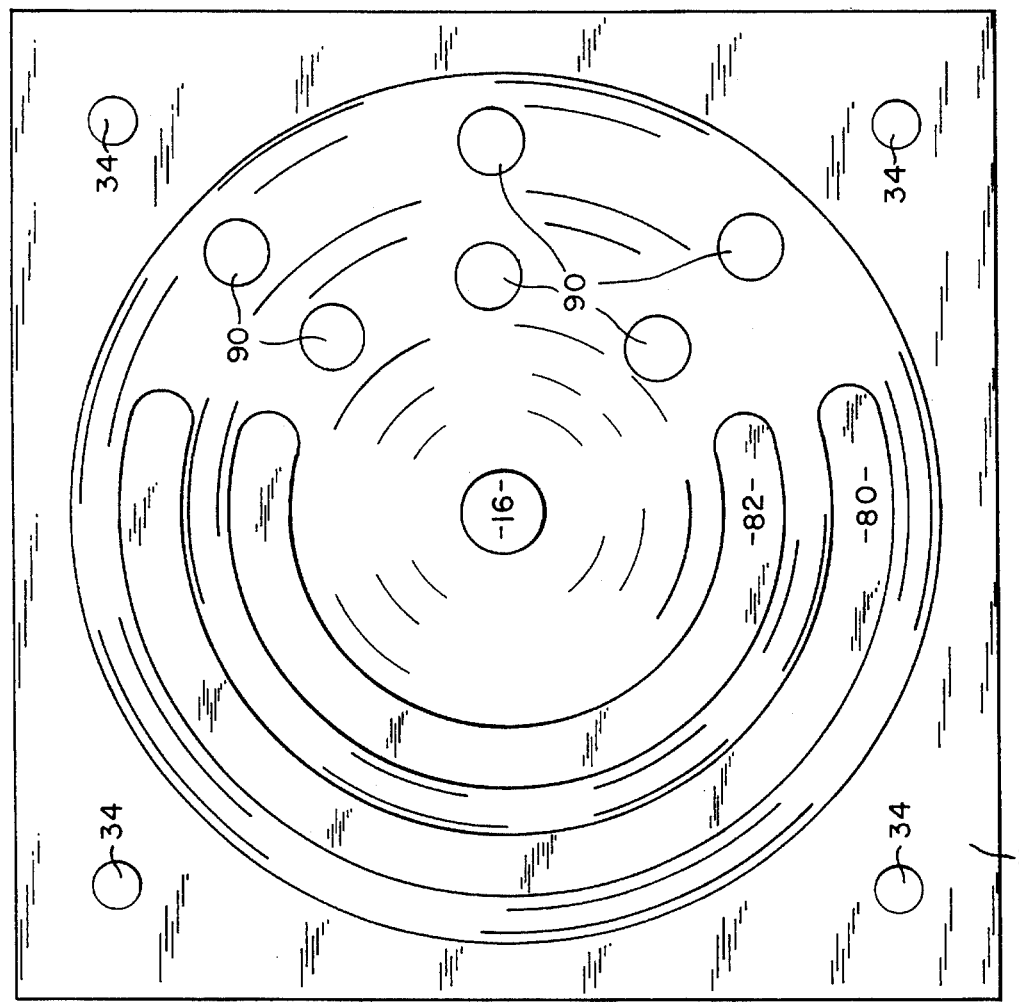
FIG. 7, is an end view of one of the plates of FIG. 5. which includes a second cavity.
Figure 6:
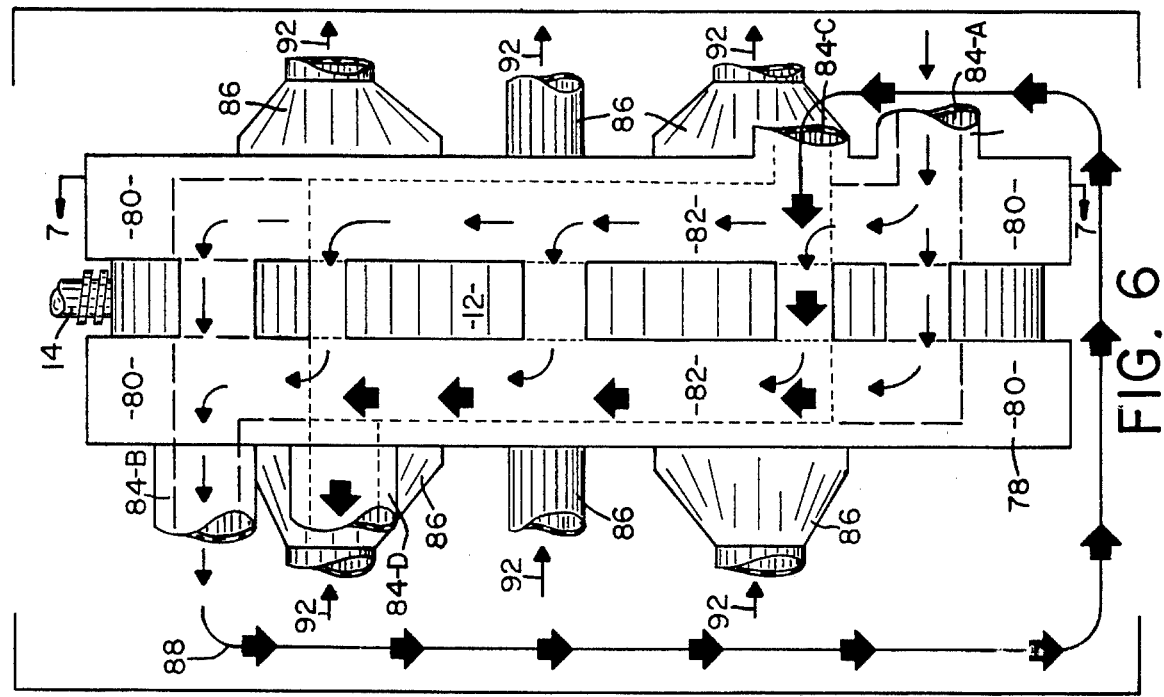
FIG. 6, is a broken schematic view of the flow path of the substance to be filtered.

Referring now to FIGS. 6 & 7, respectively, yet another embodiment is shown with 78 representing yet another pair of plates which show a double cavity system with incomplete toroidal cavities 80 and 82, respectively. The incomplete toroidal cavities 80 and 82, respectively, do not go all the way through the plates 78 but act not only as manifolds but function as final side plates as well and support the various incoming and outgoing ports 84 & 86, respectively. In FIG. 6, the various arrows depict a flow path for the substance to be filtered, in which the incoming flowing substance to be filtered (represented by small arrows) enters the input port 84-A through cavity 80 and exits from port 84-B, while the large arrows depict a flow path 88 which exists from port 84-B into the input port 84-C through cavity 82 and exits from 84-D. In FIG. 7, 90 are bores through the side plates 78 which register with the filter bores 18 in the gear of choice to allow a series of cleaning paths, as depicted by arrows 92.

A variation of the side plates 78 is shown in FIGS. 11, 12 and 13, respectively, which shows only one cavity 94 being used in each of a pair of side plates 96 (only one side plate 96 is shown).

Figure 4:
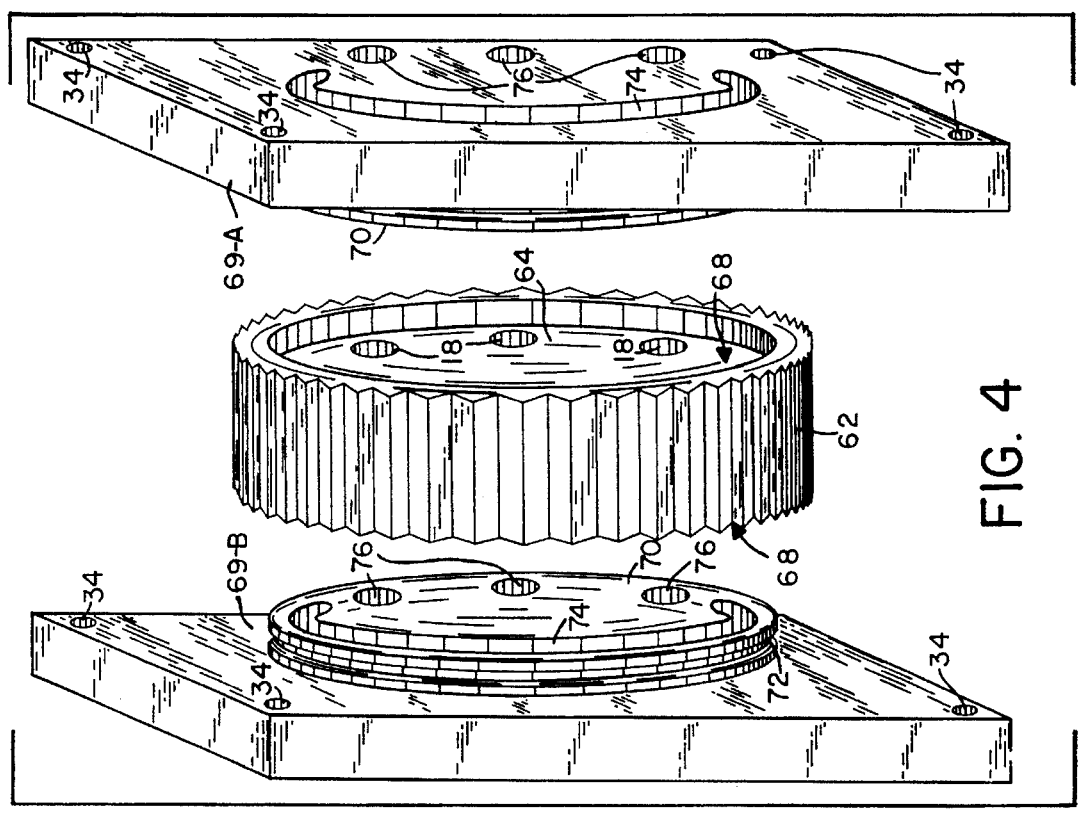
FIG. 4, is an exploded perspective view of a partial second embodiment.
Figure 8:
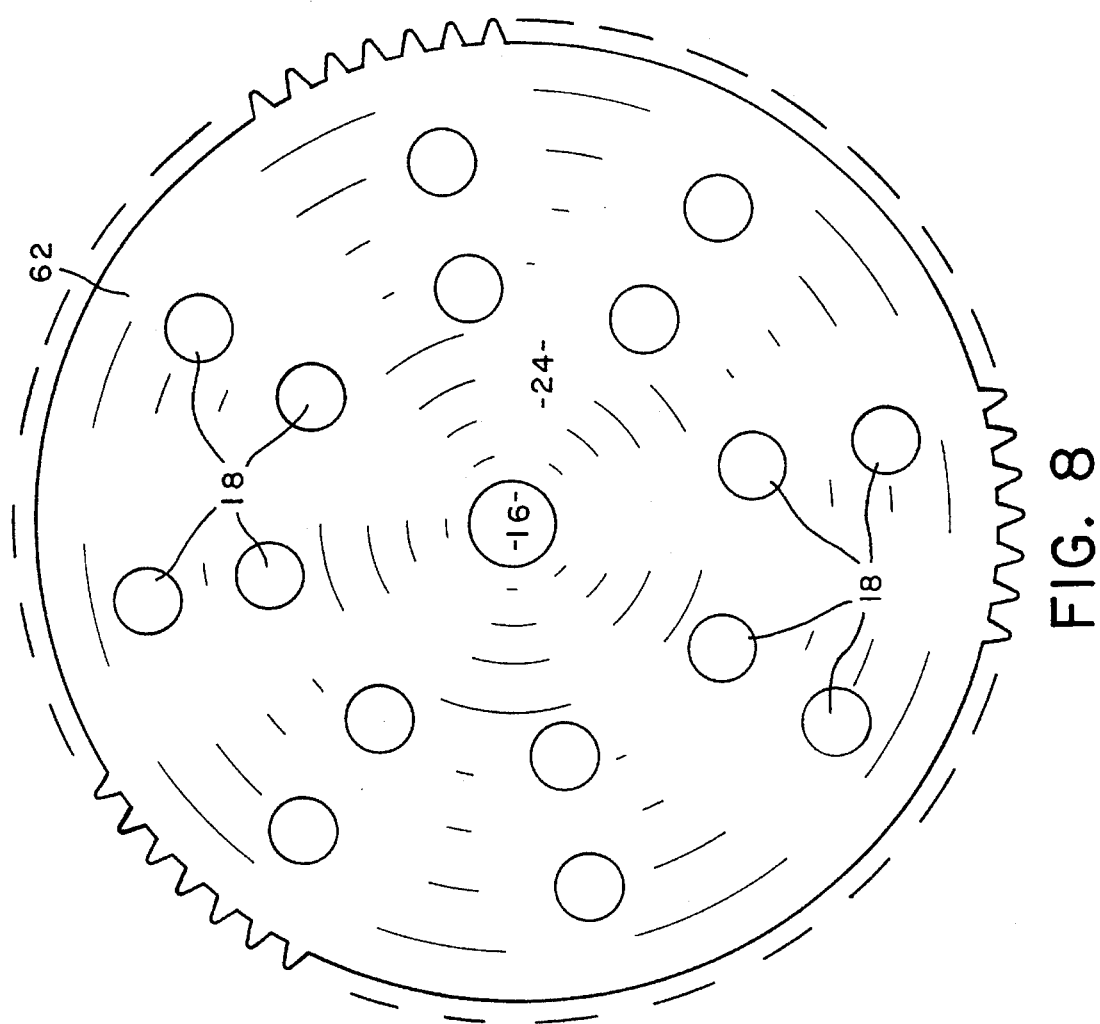
FIG. 8, is an end view of the a gear having multiple holes 18.

FIG. 8, more clearly defines the bores 18 in a typical gear which may be supported by a shaft through the center bore 16 or supported by the bosses 70, as shown in FIG. 4.

The following is a simplified plan describing the flow path for a flowing substance to be filtered which includes a means to introduce a backflushing flowing substance into the backflush ports, whereby, when a flowing substance to be filtered is introduced into the inlet port, the substance to be filtered will pass through;

(a) the inlet port;
(b) the inlet cavity;
(c) at least two of the filters;
(d) the outlet cavity;
(e) the outlet port; and when the backflushing substance is introduced into the backflushing port of the second plate, the backflushing substance will pass through;

(a) the backflushing port of he second plate;
(b) at least one of the filters;
(c) the backflushing port of the first plate; and in a direction opposite to the direction of flow of the substance to be filtered.

The above described flow path differs from the above plan when applied to a different embodiment, such as the embodiment of FIGS. 6 & 7, as follows;

When the substance to be filtered is introduced into the inlet port, the substance to be filtered will pass through;

(a) the first inlet port;
(b) the first inlet cavity;
(c) at least two of the filters;
(d) the first outlet cavity;
(e) the first outlet port;
(f) means connecting the first outlet port of the second plate into the second inlet port of the first plate;
(g) the second inlet port;
(h) the second inlet cavity;
(i) at least two of the filters;
(j) the second outlet cavity;
(k) the second outlet port and when the backflushing substance is introduced into the backflushing ports of the second plate, the backflushing substance will pass through;

(a) the backflushing ports of the second plate;
(b) at least one of the filters disposed within the holes of the first and second circular patterns of the filter housing;
(c) the backflushing ports of the first plate; and in a direction opposite to the direction of flow of the substance being filtered.

It is to be noted that various combinations of the various elements taught in the various embodiments may be used by engineering choice to accomplish the desired end result for each design application and that a single pair of side plates, or multiple pairs of side plates may be used and each may be made of different materials if required.

Also the drive means mechanism to drive the worm gear may be variable in speed by using (for example) an electric motor with a speed control (not shown) or if the drive means is derived from the affluent stream, a transmission may be used for varying the speed (not shown).

The various plates and gears may also be made from various materials of choice, such as metal, fiber-glass, or any one of the plastic groups, etc.

It is again to be noted that the self-cleaning filter system as herein disclosed may be designed to use only the backflush of the affluent or by multiple cleaners through the multiple paths which may call for more exacting cleaning agents, such as solvents, air, steam, etc.

It will now be seen that we have herein provided a unique filter system, heretofore not seen.

It will further be seen that we have provided a filter system which may remove undesirable contaminates from the material stream on a continuous basis.

It will still further be seen that we have provided a filter system which provides substantially a constant volume and/or pressure to the effluent side of the filter.

It will also be seen that we have provided a filter system which can be constructed in a number of embodiments to fulfill the needs of the industry.

It will further be seen that we have provided a filter system which has separate paths for the filter stream and the contaminant removal stream.

It will also be seen that we have provided a filter system which can use another media or material other than the main stream material, such as steam, compressed air, solvents, etc., for the contaminate removal.

It will be seen that we have provided a filter system which may (in one embodiment) be self-propelled, i.e., driven by the material stream.

It will further be seen that we have provided a filter system which does not allow the receiving end of the filter to come in contact with the "cleaned" stream as it becomes important in air filtering systems (such as within a clean room) for electronic assembly or bacterial free rooms for surgery.

We have herein further provided a filter system which is not limited in size but can be made small enough (for illustration) to be used to remove contaminants from an auto or diesel exhaust or large enough (for illustration) to span a river and filter unwanted debris or chemicals from the flowing river.

We have also provided a filter system which is capable of oil removal from water, such as in the case of oil spills.

We have also provided a filter system which may continually remove smoke from a smoke stack.

We have further provided a filter system which is portable and which may be battery powered for use by fire fighters or the like.

We have herein provided a filter system which can utilize practically any conventional filter element design including conventional candle type filter elements, i.e. tubular cartridges or other designs, as well as specific and unique filter designs, such as annular screen packs or membranes.

In summary, we have provided a continuous self-cleaning, rotary filtering system having a plurality of filter elements within a rotatable filter housing adapted for rotation about its central axis and sandwiched between an inlet plate having an inlet cavity and an outlet plate having an outlet cavity so that the influent substance to be filtered is passed from the inlet cavity through the filter elements and through the outlet cavity. The system is further provided with back-flushing capabilities, whereby, the filter housing is rotated to pass each filter sequentially between matching back-flush ports in the inlet and outlet plates and the back-flush ports can be multiple, that is, several back-flush ports can be utilized to use different cleaning substances of choice in sequential operation. Also, multiple filters arranged in multiple circular patterns may be utilized within the filter housing and in alignment with multiple cavities in the inlet and outlet plates to allow the output of a first cavity to be directed into the input of a second cavity, etc., so that the influent substance may be filtered through multiple filters with different characteristics before finally being discharged as a now clean affluent of a quality of engineering choice.

In addition to the above described features of the filter system of this invention, it should be obvious that additional components will be required, such as associated with conduit lines for feeding the substance being filtered to and from the filter apparatus and means for coupling the components together as necessary to maintain tight interfaces of the component parts and yet permit rotation of the filter housing without any serious leaking of the filtered substance between the stationary and rotating parts. Such connecting means and including adjustable interface pressure controlling means are within the skill of the art and need not therefore be described herein.

It should be apparent from the above description that numerous modifications, altered embodiments and various combinations of the disclosed element herein could be utilized without departing from the spirit of the invention as herein taught. For example, while an eight and a sixteen filter element apparatus has been depicted in the above described detailed embodiments, it is apparent that any desired or required number of various filter elements could be incorporated, provided all are equally spaced on a given radius from the axis of rotation so that each rotation will cause the successive filter elements to be revolved through the back-flush position or positions and returned to service.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatuses.

Having described our invention, what we claim as new and desire to secure by letters patent is:

1. A continuous, self-cleaning filter system comprising: a filter housing constructed and arranged for rotational motion about an axis of said filter housing, said housing having a plurality of holes parallel to said axis disposed in a circular pattern around said axis, filter means disposed within said holes, means to rotate said housing, a first stationary plate having an incomplete toroidal opening extending through said first plate, a second stationary plate having an incomplete toroidal opening extending through said second plate, said opening registering and in communication with at least two of said holes in said filter housing, said plates sandwiching said filter housing between them forming inwardly facing interfacing surfaces and each of said first and second plates having at least one backflush port independent of said toroidal openings, each backflush port being in alignment with each other when assembled and disposed in a path of at least one of said holes in said filter housing when said filter housing is rotated, said at least one of said holes being different than said at least two of said holes at any given time a third stationary plate sandwiched onto said first plate and having an inlet port communicating with said toroidal opening in said first plate, a fourth plate sandwiched onto said second plate and having an outlet port communicating with said toroidal opening in said second plate, said third and fourth plates each having at least one backflush port in alignment with said at least one backflush ports on said first and second plates, a flowing substance to be filtered and means to introduce a backflushing flowing substance into said at least one backflush port, whereby, when said substance to be filtered is introduced into said inlet port, said substance to be filtered will pass through;
(a) said inlet port in said third plate;
(b) said toroidal opening in said first plate;
(c) said at least two holes each containing a filter in said filter housing;
(d) said toroidal opening in said second plate;
(e) said outlet port in said fourth plate; and when said backflushing substance is introduced into said backflushing port of said second plate, said backflushing substance will pass through;
(a) said backflushing port of said fourth plate and said second plate;
(b) at least one of said filters;
(c) said backflushing port of said first plate and said third plate; and in a direction opposite to the direction of flow of said substance to be filtered.

2. A continuous, self-cleaning filter system comprising: a filter housing constructed and arranged for rotational motion about an axis of said filter housing, said housing having a plurality of holes parallel to said axis disposed in a circular pattern around said axis, filter means disposed within said holes, means to rotate said housing, a first stationary plate having an inlet port leading into a toroidal cavity defined as an incomplete toroidal opening partially extending through said first stationary plate, a second stationary plate having an outlet port leading from a toroidal cavity within said second stationary plate, said cavities having an open side registering and in communication with at least two of said holes in said filter housing, said plates sandwiching said filter housing between them, each of said plates having inwardly facing circular bosses, said filter housing having a pair of circular recessed inner surfaces, said recessed inner surfaces forming an interface with said circular bosses, said recessed inner surfaces accepting and mating with said circular bosses to form a working seal, said plates having at least one backflush port independent of said cavities, each backflush port being in alignment with each other when assembled and disposed in a path of at least one of said holes when said filter housing is rotated, said at least one of said holes being different than said at least two of said holes at any given time, a flowing substance to be filtered and means to introduce a backflushing flowing substance into said backflush ports, whereby, when said substance to be filtered is introduced into said inlet port, said substance to be filtered will pass through;
(a) said inlet port in said first plate;
(b) said inlet cavity in said first plate;
(c) said at least two holes each containing a filter in said filter housing;
(d) said outlet cavity in said second plate;
(e) said outlet port in said second plate; and when said backflushing substance is introduced into said backflushing port of said second plate, said backflushing substance will pass through;
(a) said backflushing port of said second plate;
(b) at least one of said filters;
(c) said backflushing port of said first plate; and in a direction opposite to the direction of flow of said substance to be filtered.

3. The self-cleaning filter of claim 2 in which said first and said second plates have multiple backflush ports independent of said cavities and in alignment with each other when in an assembled position.

4. A continuous, self-cleaning filter system comprising: a filter housing constructed and arranged for rotational motion about an axis of said filter housing, said housing having two sets of holes parallel to said axis disposed in a first and second circular pattern around said axis with each pattern having a different radius from said axis, filter means disposed within said holes, means to rotate said housing, a first stationary plate having a first and second inlet port, said first inlet port leading into a first toroidal cavity defined as an incomplete toroidal opening partially extending through said first stationary plate, said second inlet port leading into a second toroidal cavity defined as an incomplete toroidal opening partially extending through said first plate, a second stationary plate having a first and second outlet port, said first outlet port leading from a first toroidal cavity defined as an incomplete toroidal opening partially extending through said second plate, said second outlet port leading from a second toroidal cavity defined as an incomplete toroidal opening partially extending through said second stationary plate, means connecting said first outlet port of said second stationary plate into said second inlet port of said first plate, said cavities having an open side registering and in communication with at least two of said holes in said filter housing, said plates sandwiching said filter housing between them forming inwardly facing interfacing surfaces and each plate having at least two backflush ports independent of said cavities, each backflush port being in alignment with each other when assembled and disposed in a path of at least one of said holes in said filter housing when said filter housing is rotated, said at least one of said holes being different than said at least two of said holes at any given time, a flowing substance to be filtered and means to introduce a backflushing flowing substance into said backflush ports, whereby, when said substance to be filtered is introduced into said inlet port, said substance being filtered will pass through;
 (a) said first inlet port in said first plate;
 (b) said first inlet cavity in said first plate;
 (c) said at least two holes each containing a filter in said filter housing;
 (d) said first outlet cavity in said second plate;
 (e) said first outlet port in said second plate;
 (f) means connecting said first outlet port of said second plate into said second inlet port of said first plate;
 (g) said second inlet port;
 (h) said second inlet cavity;
 (i) at least two of said filters;
 (j) said second outlet cavity;
 (k) said second outlet port and when said backflushing substance is introduced into said backflushing ports of said second plate, said backflushing substance will pass through;
 (a) said backflushing ports of said second plate;
 (b) at least one of said filters disposed within said holes of said first and second circular patterns of said filter housing;
 (c) said backflushing ports of said first plate; and in a direction opposite to the direction of flow of said substance to be filtered.

5. The self-cleaning filter of claim 4 in which said first and said second plates have multiple backflush ports independent of said manifolds and in alignment with each other when in an assembled position.

* * * * *